US006202507B1

(12) United States Patent
Phillips (10) Patent No.: US 6,202,507 B1
(45) Date of Patent: Mar. 20, 2001

(54) SUPPORT HOUSING FOR A SHAFT-MOUNTED SPEED REDUCER

(75) Inventor: Allyn E. Phillips, Salem, SC (US)

(73) Assignee: Reliance Electric Technologies, LLC, Thousand Oaks, CA (US)

( * ) Notice: Subject to any disclaimer, the term of this patent is extended or adjusted under 35 U.S.C. 154(b) by 0 days.

(21) Appl. No.: 09/409,957

(22) Filed: Sep. 30, 1999

(51) Int. Cl.$^7$ .................................................. F06H 57/02
(52) U.S. Cl. .......................................................... 74/606 R
(58) Field of Search ........................................... 74/606 R (56) References Cited

U.S. PATENT DOCUMENTS

| | | | |
|---|---|---|---|
| 3,348,430 | 10/1967 | Polzin | 74/606 |
| 4,108,021 | 8/1978 | MacAfee et al. | 74/606 |
| 4,626,114 | 12/1986 | Phillips | 384/584 |
| 5,197,345 | 3/1993 | Rose | 74/421 |
| 5,404,772 | 4/1995 | Jester | 74/606 |
| 5,667,333 | 9/1997 | Phillips | 403/369 |

OTHER PUBLICATIONS

Dorris Torque Drives, Inc.; "Shaft Mount and Screw Conveyor Gear Drive—Introducing 507TR".
Browning Morse, Emerson Power Transmission; "Screw Conveyor Drives Units and Components".
Link–Belt Drives, Model FX Shaft Mounted Speed Reducers Model FC Screw Conveyor Drives.
Link–Belt Drives, Model FX Shaft Mounted Speed Reducers Model FC Screw Conveyor Drives; "Mounting Flexibility, etc.".
Foote–Jones/Illinois Gear; Shaft Mounted and Screw Conveyor Drives.
Dodge Gearing Engineering Catalog.
Falk Drives; "Quadrive 4000J Shaft Mounted Drives with New TA Taper Bushing".
Dodge Bearings.

*Primary Examiner*—Dirk Wright
(74) *Attorney, Agent, or Firm*—Patrick S. Yoder; John J. Horn; A. M. Gerasimow (57) ABSTRACT

A gear reducer housing includes mating front and rear shells, each formed with supports for bearings and rotating assemblies. The supports are located along a centerline of the housing shells and at two offset mirror image locations on either side of the centerline. The shell is at least partially surrounded by a peripheral flange for securing the housing shells to one another. Fastener apertures in each flange are formed to provide tolerance in the location of attachment fasteners. The flange includes fixturing pads allowing each shell to be fixtured once for a range of machining operations. Ports for lubricant permit the housing to be mounted in several angular positions.

33 Claims, 7 Drawing Sheets

SUPPORT HOUSING FOR A SHAFT-MOUNTED SPEED REDUCER

BACKGROUND OF THE INVENTION

1. Field of the Invention

The present invention relates generally to the field of speed reducers, such as single and multiple-stage gear reduction machines. More particularly, the invention relates to a technique for forming a support housing for a shaft-mounted speed reducer which facilitates manufacturing and reduces the overall number of parts and machining steps required for the manufacture of the final speed reducer product.

2. Description of the Related Art

A variety of applications exist for speed reducers, particularly for gear-type speed reduction sets. In industrial applications, for example, speed reducers are commonly employed to reduce the rotational speed of an input shaft to a desired output range. While such speed reducers may be used, inversely, to increase speed of an output shaft as a function of the input shaft rotational speed, they are more commonly employed as reducers, coupling a prime mover such as an electric motor or internal combustion engine to a driven application. Depending upon the speed and torque requirements, and the overall speed reduction ratio, speed reducers in industrial applications may include single or multiple stages. Moreover, in most applications the gear ratio of the speed reducer is fixed, with changes in input-to-output ratios being varied by varying the input speed, by gear transmissions, variable-speed sheave drives, and so forth.

In single-stage gear reducers, an input pinion or gear secured to an input shaft or hub meshes with an output gear secured to an output shaft or hub. The gear reduction ratio is defined by the parameters of the input pinion and the output gear in accordance with well established formulae. In multiple-stage gear reduction sets, multiple sets of intermeshing pinions and gears successively reduce speeds of input, intermediate, and output shafts or hubs to obtain a gear reduction ratio which is a product of the reduction ratios of the successive stages.

Speed reducers designed for industrial, mining, material handling, and similar applications, are typically configured in one of several designs to accommodate the application requirements, space constraints, and so forth. For example, certain applications may permit a gear reducer to be mounted securely on support feet on a machine frame, while other applications may call for securing the speed reducer directly to an input or output shaft or hub as an overhung load. In one particular product configuration of the latter type, a support housing is generally designed to present an output hub or shaft from which the gear reducer itself may be hung. When installed, the gear reducer housing is restrained from rotation so as to permit torque to be transferred to the supporting shaft or hub as the input shaft is driven in rotation and the input speed is reduced through the internal gearing.

Gear reducer housings are often one of the more complex and costly components of a gear reducer. For industrial gear reducers, housings are commonly cast and subsequently machined to form the necessary sealing surfaces, bearing support surfaces, access ports, and so forth. For speed reducers designed to be support on shafts or hubs as overhung loads, front and rear housing or shell portions are typically designed and manufactured separately, and mated with one another in sets to enclose an internal cavity in which the gears, pinions, shafts, bearings and other components are positioned.

Conventional designs of gear reducer support housings suffer from numerous drawbacks. For example, as noted above, the components are generally separately designed and manufactured as differently configured parts, adding significant cost and inventory to the overall product configuration. Machining process must typically be specifically adapted to the housing geometries, often requiring multiple fixtures for supporting and presenting the castings for machining. Moreover, where a family of gear reducers includes multiple sizes, ratings, gear reduction ratios, and number of stages, separate and distinct housing configurations are often designed, again multiplying the number of separate components in the family of products, and resulting in considerable additional cost, engineering and machining time, and inventory requirements.

There is a need, therefore, for an improved configuration of gear reducer support housings. There is a particular need for an improved approach which could reduce the overall number of parts in a single gear reducer design, as well as throughout a gear reducer product family. There is also a need for an improved design which can be easily formed and manufactured, with a reduction in the number of separate fixtures and operations involved in machining of a raw housing casting.

SUMMARY OF THE INVENTION

The invention provides a novel technique for configuring a speed reducer housing designed to respond to these needs. The technique may be employed in any suitable gear reducer design, but is particularly well suited to shaft or hub-mounted speed reducers. The overall housing design, and inventive features of the design may be adapted to accommodate both single-stage gear reducers and multiple-stage reducers. Where desired, the housing may accept both single and multiple-stage reduction sets, depending upon the particular features machined in the original casting. Additional features of the inventive technique may facilitate machining and fixturing operations, ultimately allowing all or virtually all machining operations to be accomplished on a housing component in a single fixture.

In accordance with a presently preferred configuration, the housing in accordance with the present technique is designed as a pair of mirror-image housing shells, the original castings for which are identical. Thus, from a single casting, the housing shell components may be formed by appropriately machining bearing support surfaces, apertures, access ports, and so forth. The casting may be advantageously configured with fixture regions or pads along a peripheral surface, such that sealing surfaces required to mate the housing components may be machined without removing the original casting from a machine fixture. Subsequent machining operations may also be performed in the same fixture. Still additional features of the housing may include securement apertures for attaching the housing shells to one another. These may be cast directly into the housing components, and may include angularly-offset fastener slots disposed at mirror-image locations with respect to a centerline of the housing shell. Thus, when the identical housing shell castings are subsequently machined and later joined in the final product, casting tolerances are sufficient to permit the housing shells to be secured to one another by virtue of the alignment of the slots with one another.

The technique thus permits a cost effective design of speed reducers in which the number of separate castings and machining operations is significantly reduced. The reduction in the number of separate parts may be further optimized through coordination of the design of the individual speed reducers in a family of products. Overall costs and inventory are thereby reduced.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
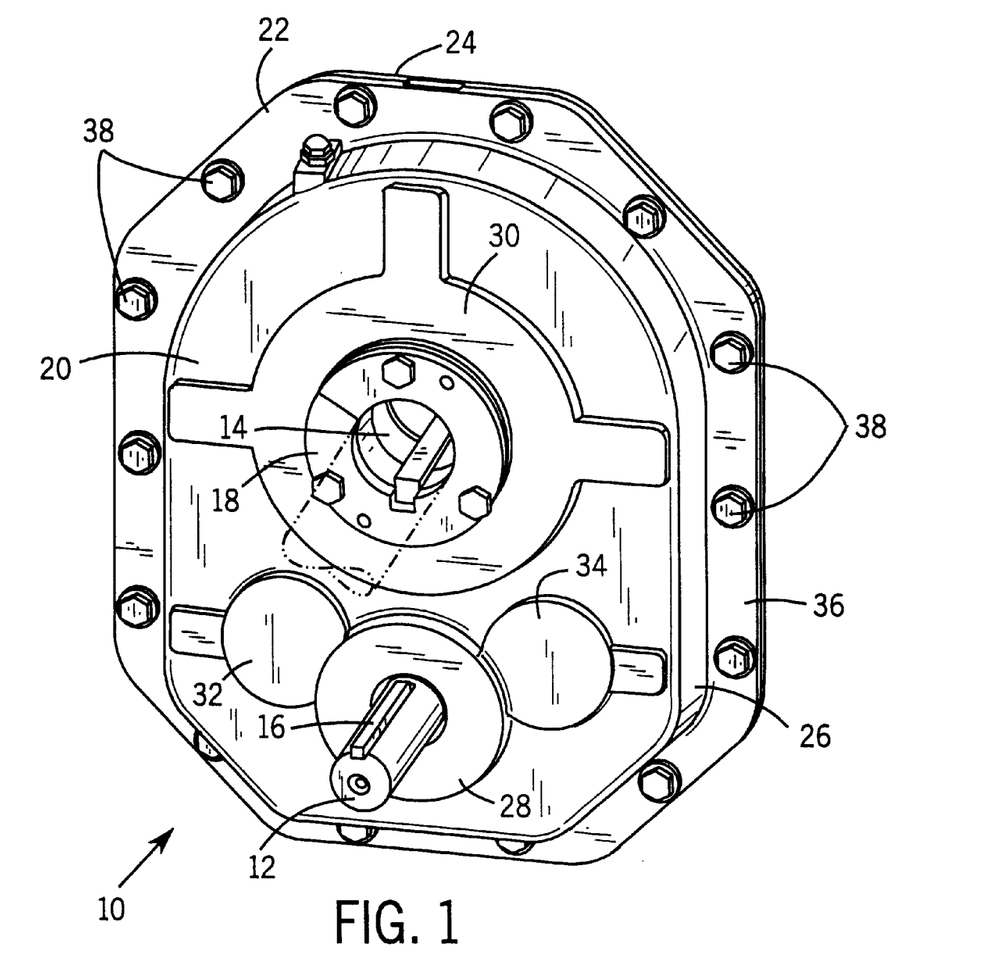
FIG. 1 is a perspective view of a speed reducer including a housing configured in accordance with certain aspects of the present technique.

Turning now to the drawings, and referring first to FIG. 1, a two-stage gear reducer, represented generally by the reference numeral 10, is illustrated as including an input shaft 12 which will be driven in a final application, and which will transmit mechanical power to an output hub 14 as described more fully below. It should be noted that while reference is made in the present description to input and output shafts and hubs, aspects of the present invention are not intended to be limited to any particular input or output configuration. In particular, input can be made into the gear reducer via an input hub configuration, or a shaft, with output from the gear reducer being made through a hub as illustrated, or via an output shaft. Similarly, while reference is made herein to a gear reducer, the machinery described herein may be employed for increasing speeds, where desired. In the illustrated embodiment, input shaft 12 is provided with a standard key 16 for transmitting torque, while output hub 14 is provided with a taper locking coupling system 18 and a key. Again, any suitable arrangements may be made for coupling the input and output components to other machinery, including keyed shafts and hubs, splined shafts and hubs, and so forth.

Gear reducer 10 includes a housing 20 for supporting at least the input and output rotating assemblies associated with shaft 12 and hub 14, as well as other rotating assemblies used to transmit torque between these components. As illustrated in FIG. 1, housing 20 includes a front housing half or shell 22, and a rear housing half or shell 24. As described in greater detail below, the housing shells are configured as identical structures, such that initial blanks or castings for the shells may be machined and assembled to form both the front and back shells. Each shell 22 and 24 of housing 20 includes an extending body portion 26 designed to enclose internal components of the gear reducer as described below.

Each shell 22 and 24 of housing 20 includes a series of support structures integrally formed therein for mechanically supporting rotating assemblies. These assemblies may include the input shaft 12, the output hub 14, as well as additional input or output assemblies, and intermediate rotating assemblies for transmitting torque in multiple stages. In the preferred embodiment illustrated, four support structures are provided on each housing shell, including an input support 28, and output support 30, a first offset support 32, and a second offset support 34. Again, the designations as input or output supports should not be interpreted as limiting the applicability of the various support locations. Input or output rotating structures may be provided at any one of the supports. The front and rear shells of housing 20 each are surrounded by a partial or, in the preferred embodiment illustrated, a complete peripheral flange 36 for facilitating assembly of the gear reducer. In particular, the shells are secured to one another with the rotating assemblies positioned therein, via a series of fastener sets 38 extending through the peripheral flanges. As noted below, the configuration of the gear reducer with the peripheral flange and fastener sets also facilitates mounting of the gear reducer. In particular, machine mounting flanges, support structures, and so forth (not shown) may include apertures which also receive certain of the fastener sets extending through the peripheral flanges of the gear reducer to support the gear reducer in given applications.

In the preferred embodiment illustrated, the gear reducer features enable the gear reducer to be configured in one of a number of ratings, depending upon the internal configuration of the gearing intermeshing to define the gear ratio. Moreover, the gear reducer housing is particularly well suited to both single-stage configurations as well as multiple-stage units, both based upon the same identical housing shell castings. As described below, in the illustrated embodiments, reference numeral 10 generally refers to an exemplary two-stage gear reducer, while reference numeral 11 (see, e.g., FIGS. 3A and 3B) refers to a single-stage gear reducer constructed of the same housing shells, or housing shells designed with the features described herein.

Figure 2A:
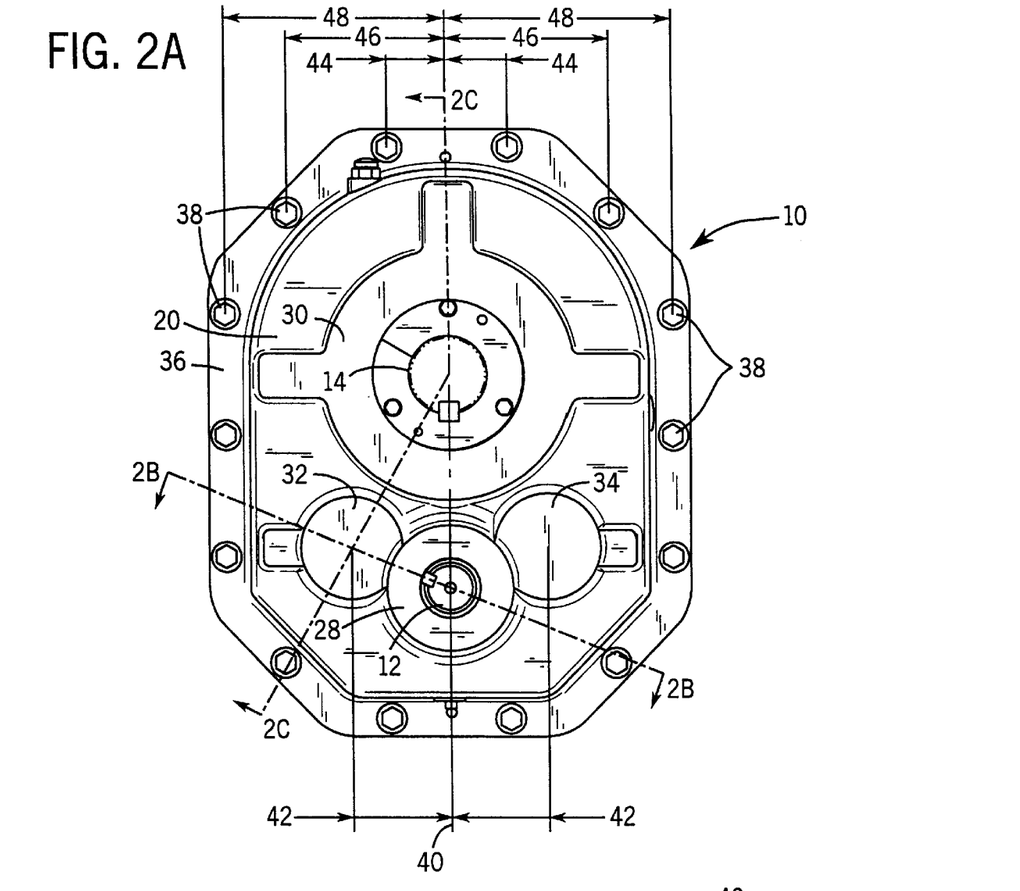
FIG. 2A is an elevational view of the speed reducer of FIG. 1, illustrating certain preferred features and geometries useful in configuring the housing shells or components.

To facilitate the use of components through a variety of gear reducer sizes and ratings, and to enable identical components to be used for front and back portions of the gear reducer, certain of the structural features of the housing and gear reducer are formed in mirror-image locations as best illustrated in FIG. 2A. As shown in FIG. 2A, the gear reducer housing 20 in which gear reducer 10 (or 11 as described below) is assembled, has a longitudinal centerline 40 about which the structural features are provided in mirror-image locations. The first and second rotating assembly supports 28 and 30 are provided on the longitudinal centerline 40. The third and fourth rotating assembly supports 32 and 34, offset from the centerline 40, are centered at identical distances from the centerline, as indicated by reference numerals 42 in FIG. 2A. As described below, this configuration enables supports on a front shell of the housing to correspond exactly to locations of mirror-image supports on the rear shell of the housing. That is, for the front shell illustrated in FIG. 2A, offset support 32 will overlie offset support 34 of the rear housing shell, with offset support 34 of the front housing shell overlying offset support 32 of the rear shell. The internal configuration of these features, and the manner in which they overlie one another will be described more fully below.

In addition to the mirror-image locations of the rotating assembly supports, housing 20 includes a series of locations for the fastener sets 38 which are also disposed in mirror-image locations about centerline 40. In particular, in the illustrated embodiment a series of fastener set locations are provided at distances 44, 46 and 48 identically offset from the centerline. Thus, when front and rear housing shells are mated with one another, fastener set locations on either side of the centerline will overlie one another.

Figure 2B:
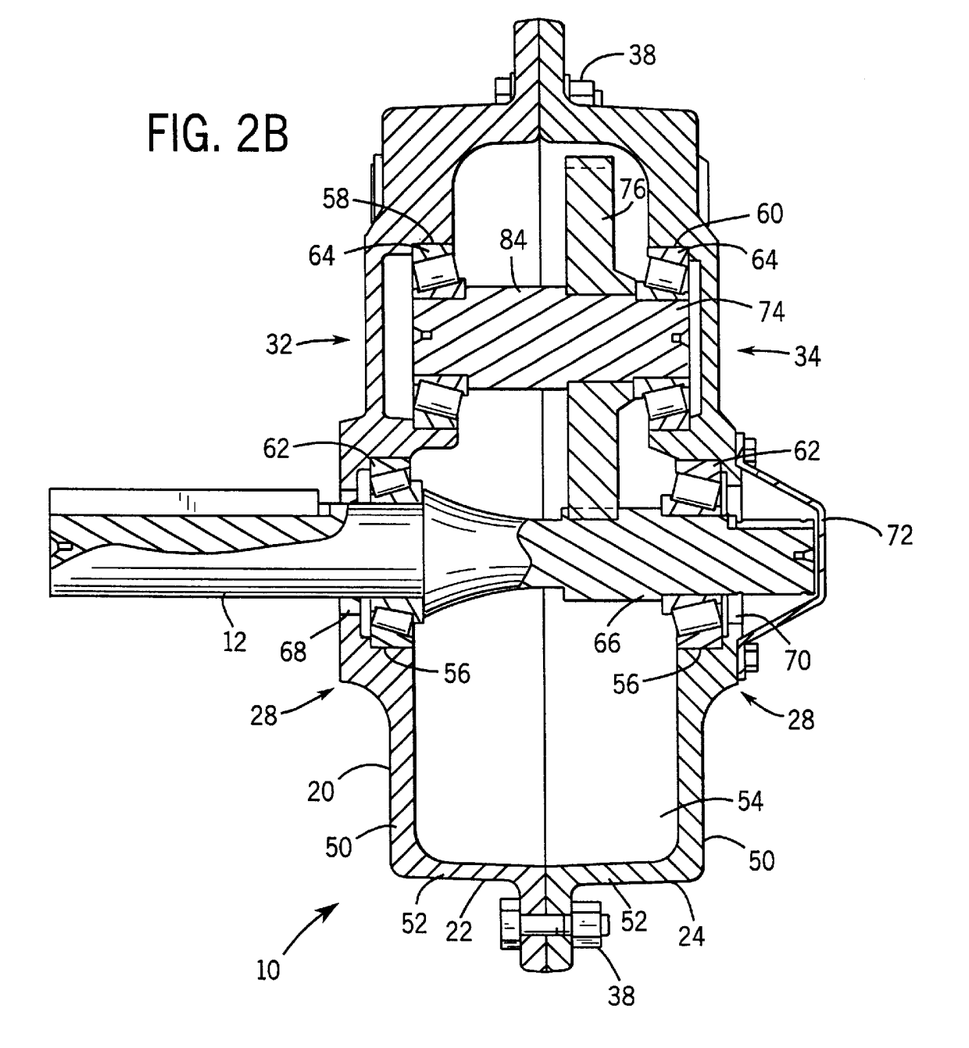
FIG. 2B is a sectional view of the gear reducer of FIG. 2A taken along line 2B—2B.
Figure 2C:
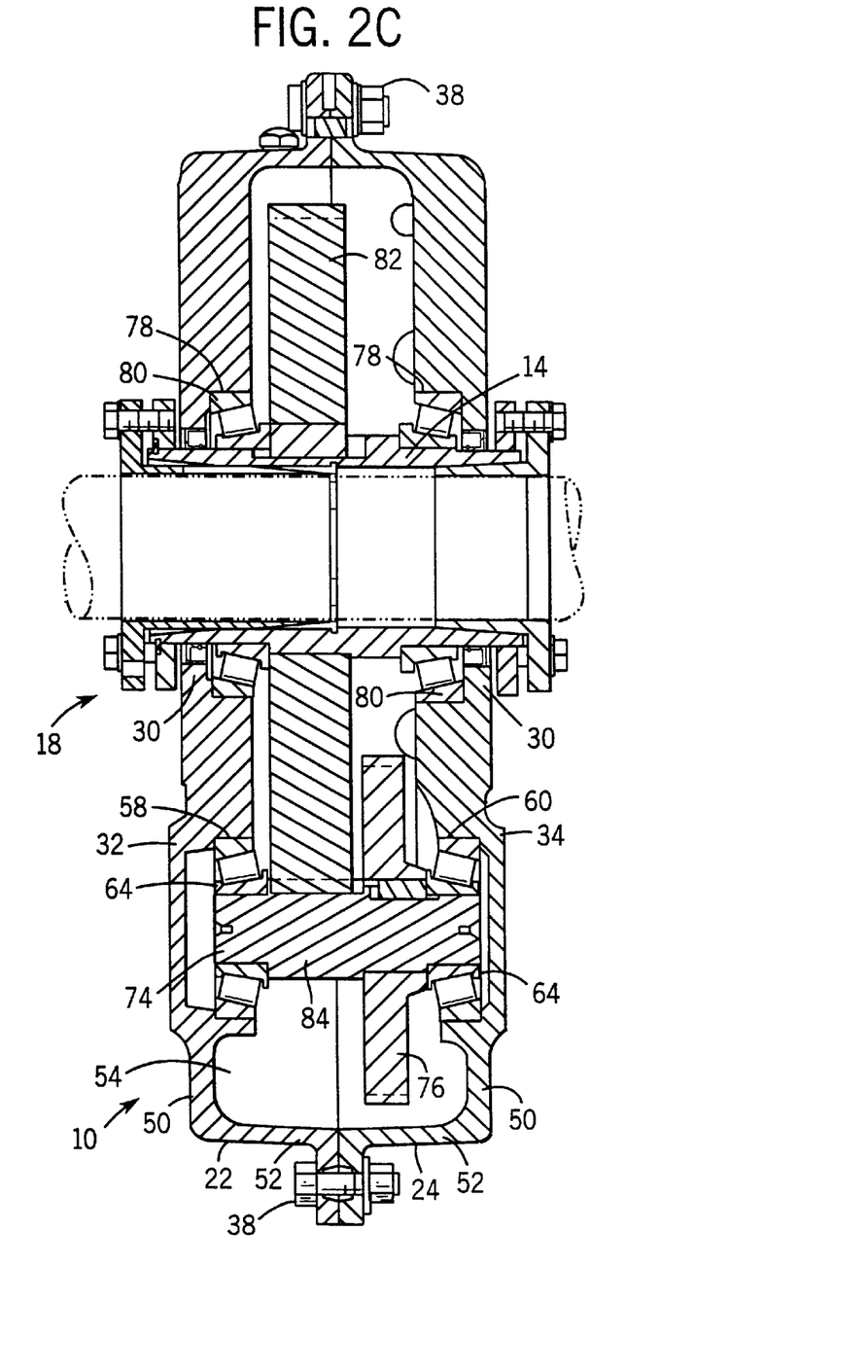
FIG. 2C is a sectional view of the gear reducer of FIG. 2A taken along line 2C—2C.

Referring now more particularly to the internal configuration of the gear reducer illustrated in FIG. 2A, FIGS. 2B and 2C depict two different torque-transfer paths through the rotating assemblies supported at the support locations described above. FIG. 2B illustrates shaft 12 extending through front housing shell 22 and rear housing shell 24 in a presently preferred arrangement. As shown in FIG. 2B, front housing shell 22 and rear housing shell 24 are identical structures, each including a generally planar wall 50 formed integrally with a peripheral wall 52. Walls 50 and 52 of each housing shell, when assembled in the product, enclose an internal cavity 54 in which the gearing, bearings, and other components of the gear reducer are positioned.

At each rotating assembly support location, the housing shells are provided with support structures which can be machined to receive a support bearing assembly for the rotating assembly. In particular, as shown in FIG. 2B, supports 28, receiving shaft 12, and supporting the shaft in rotation, each include a bearing support 56 machined within enlarged regions or ribs integrally formed in the casting or blank from which the housing shells are machined. Similar bearing supports 58 and 60 are formed in front housing shell 22 and rear housing shell 24, respectively, to support an intermediate rotating assembly. Again, due to the mirror-image and identical structures of the front and rear housing shell castings, when assembled in the gear reducer as shown in FIG. 2B, support 32 of the front housing shell 22 overlies support 34 of the rear housing shell 24. Within bearing supports 56, bearing assemblies 62 are provided for supporting shaft 12 in rotation. Similarly, bearing sets 64 are provided in bearing supports 58 and 60 of the front housing shell 22 and the rear housing shell 24, respectively.

Each rotating assembly of the gear reducer, supported at a corresponding support location, will generally include a rotating support member, such as a shaft or hub, and gearing, such as a pinion or gear wheel affixed to the shaft or hub. In the embodiment illustrated in FIG. 2B, input shaft 12 includes a pinion 66 which is formed integrally with the shaft. Alternatively, gearing or a pinion may be affixed to the shaft in a subsequent operation. Shaft 12 extends through apertures 68 and 70 formed through front housing shell 22 and rear housing shell 24, respectively. At each location where the shaft extends through the shell, seal assemblies (not shown in FIG. 2B) may be provided for retaining lubricant within the gear reducer housing and preventing the ingress of contaminants and fluids from outside the housing. A blind end of shaft 12, extending through aperture 70 and rear housing shell 24 is covered by a sealed cover assembly 72. An intermediate rotating assembly consisting of a shaft 74 and gear 76 are supported by bearings 64. The gear 76 of the intermediate rotating assembly meshes with pinion 66 of shaft 12 to provide an initial or first stage gear reduction. These components are again illustrated in FIG. 2C, along with the rotating assembly associated with hub 14.

Referring to FIG. 2C, bearing supports 78 are formed at the location of output support 30 of both front and rear housing shells 22 and 24. Again, by virtue of the mirror-image configuration of the gear reducer housing, and the use of identical front and rear shell castings, the locations of these supports overlie one another in the assembled product. Bearing sets 80 are supported within bearing supports 78, and, in turn, support hub 14 in rotation. An output gear 82 is secured to hub 14 and rotates therewith, intermeshing with a pinion section 84 of shaft 74. Pinion section 84, in the illustrated embodiment, is formed integrally with shaft 74 adjacent to the location of gear 76 in the assembled product.

In the case of the multi-stage gear reducer 10, the structure described above provides integral support locations for the input, output, and intermediate rotating assemblies in locations which overlie one another. It should be noted, that not all of the integral supports formed with the housing shells need be machined to receive bearing sets or rotating assemblies. In particular, in the multi-stage gear reducer 10 shown in FIGS. 2A, 2B and 2C, the offset support 32 of the front shell half is machined to receive a bearing set, as is the offset support 34 of the rear shell. However, the offset support 34 of the front shell, and the offset support 32 of the rear shell need not be machined if no rotating assembly is to be supported therein. It should also be noted, that while identically sized and rated bearing sets may be provided on either side of each rotating assembly, depending upon anticipated loading, bearing sets of different sizes or ratings may be provided. In particular, as shown in FIG. 2B, bearing sets 62 on either side of input shaft 12 have different sizes and ratings in view of the anticipated loading of the shaft. Similarly, the bearing supports formed in each support structure may be machined to different dimensions (e.g., diameters and depths) to accommodate the bearing set to be supported therein.

Figures 3A, 3B:
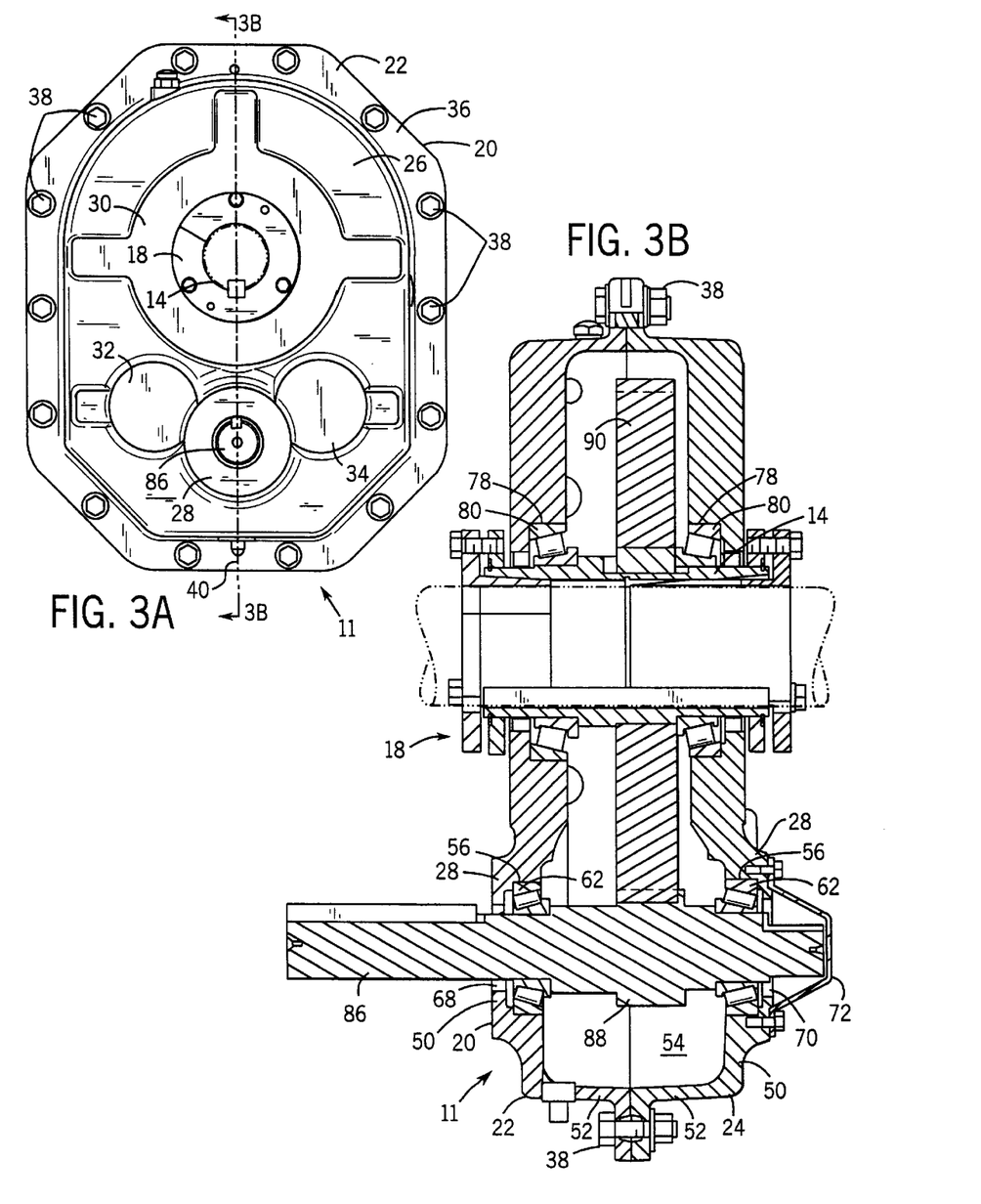
FIG. 3A is an elevational view of another speed reducer, including a single gear reduction stage, and incorporating a housing configured in accordance with certain of the inventive techniques.
FIG. 3B is a sectional view of the housing of FIG. 3A, taken along line 3B—3B.

FIGS. 3A and 3B illustrate a single-stage gear reducer 11 configured in accordance with the foregoing techniques, but including only a pair of rotating assemblies intermeshing with one another. In particular, housing 20 of single-stage gear reducer 11 may be configured identically to the housing illustrated in the foregoing figures and described above, with mirror-image rotating assembly supports, fastener set locations, and so forth about a centerline as shown in FIG. 2A. However, where a single gear reduction is needed, only certain of the locations need be machined and assembled to support rotating shafts or hubs and their associated gearing. In the embodiment illustrated in FIGS. 3A and 3B, an input shaft 86 is supported by supports 28 of front and rear housing shells 22 and 24, while an output hub 14 is supported at support 30 of both housing shells. Input shaft 86 which may be generally similar to input shaft 12 described above, or differently configured depending upon the intended application and ratings, will typically include a pinion section 88 designed to intermesh with an output gear 90 supported on hub 14. Other supports and components of the assemblies may be substantially identical to those described above. Because no rotating assemblies are provided for gear reductions between the input and output rotating assemblies, integral structures provided at supports 32 and 34 of both the front and rear housing shells need not be machined to receive support bearings.

Figure 4:
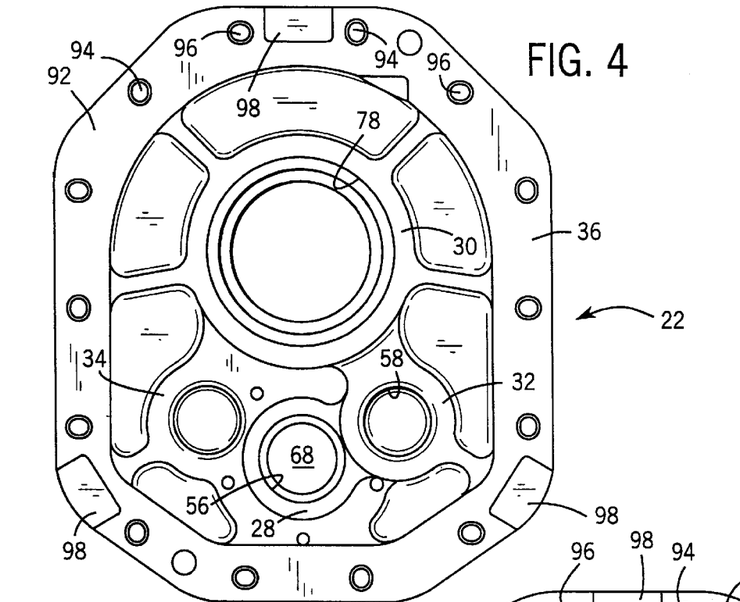
FIG. 4 is an elevational view of a single half or shell of the gear reducer housing of the type shown in FIGS. 2A and 3A, illustrating features of the original casting and machined surfaces.
Figure 5:
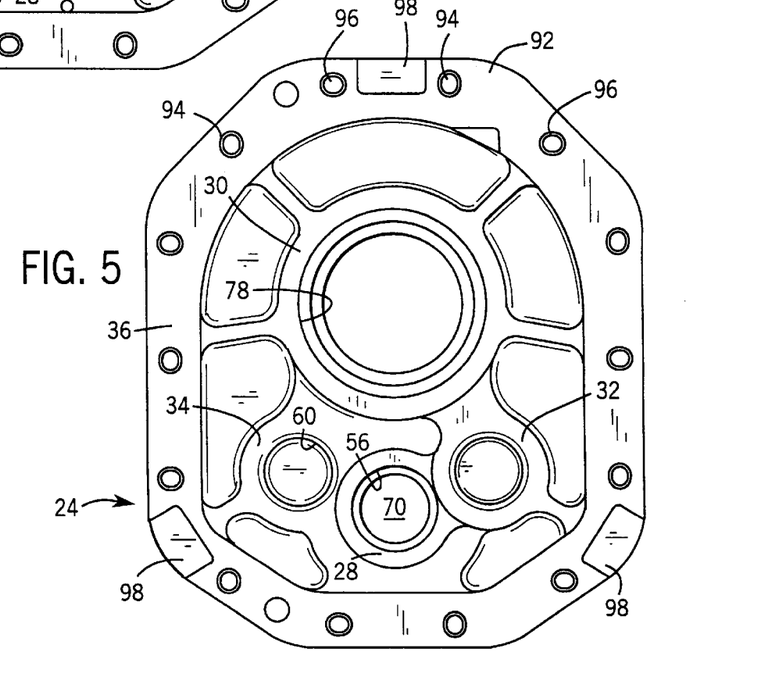
FIG. 5 is an elevational view of an opposite housing half or shell designed to mate with the housing shell of FIG. 4.

As summarized above, the gear reducers constructed in accordance with the present techniques facilitate assembly and support of various rotating assemblies, and configuration of a wide variety of gear reducer types and ratings by virtue of features of the gear reducer housing and its associated components. FIGS. 4 and 5 illustrate identical blanks for the front and rear housing shells 22 and 24, respectively, showing certain of these features. As noted above, each housing shell includes a peripheral flange 36 in which fastener sets are received to secure the housing shells to one another. Within each housing shell, rotating assembly supports 28, 30, 32 and 34 are integrally formed. While any suitable material and process may be used to form the shells incorporating the useful features herein, presently preferred materials and techniques include metal alloys, such as iron or steel alloys cast to integrally form certain of the features, and subsequently machined to refine those features needed in the assembled product.

Among the features machined in the housing shells, peripheral flange 36 preferably includes a smooth, flat sealing surface 92 formed by a milling operation on the housing shell blank. Apertures 94 and 96 formed through the flange may be conveniently cast, or may be machined in a subsequent operation. However, in the preferred embodiment illustrated, the apertures are elongated, with certain of the apertures being elongated in a generally horizontal direction as indicated at reference numeral 94, and other apertures being elongated in a generally horizontal direction as indicated at reference numeral 96. As described more fully below, with reference to FIG. 6, the elongated apertures facilitate assembly and alignment of the mirror-image housing shells. In addition to apertures 94 and 96, peripheral flange 36 preferably includes a series of machine fixturing recesses 98, three such recesses being cast into the illustrated housing shell in the preferred embodiment.

As will be appreciated by those skilled in the art, typical machining procedures for complex castings such as those employed in gear reducer housings, often require a series of machining fixtures, each designed to appropriately support and orient the casting in general purpose or specifically designed machine tools. The fixtures themselves, and the fixturing operations, can lead to substantial costs in the manufacturing process. The provision of fixturing recesses 98 has been found to greatly reduce the need to refixture the housing shells for machining of the various features required for supporting the rotating assemblies and for maintaining a sealed and lubricated interior space in the product. In particular, peripheral flange 36 is preferably cast with a desired thickness, with fixturing recesses 98 being of a reduced thickness. Moreover, fixturing recesses 98 are preferably of a thickness smaller than the final thickness of flange 36 following machining of the seal surface 92. Thus, the housing shells may be secured by clamps (not shown) in a machine fixture at the locations of fixturing recesses 98, and subsequent machining operations, including the formation of seal surface 92, may be carried out through the use of conventional machine tools without removing the shell blank from the support fixture. Where designed, the support fixture may be configured for rotation about one or more axis to facilitate access to and machining of the various bearing supports, seal surfaces, threaded lubricant supports, and so forth as may be designed into the final product.

The rotating assembly supports integrally formed into the housing shell blanks are machined in accordance with the needs of the final product configuration. In particular, as shown in FIGS. 4 and 5, where an input shaft is to be supported at supports 28, bearing supports 56 will typically be machined to receive bearing sets as described above. An aperture 68 or 70 may also be machined at the first support location as described above. Similarly, a bearing support 78 is machined to support the output rotating assembly at support 30, with additional surfaces being machined, as desired, to support seal assemblies and so forth. At offset supports 32 and 34, additional bearing support surfaces 58 and 60 are machined to support an intermediate rotating assembly. It should be noted that in the illustrated embodiment bearing support 60 in front housing shell 22 is not machined and that bearing support 58 in rear housing shell 24 is not machined. Again, it should be noted that, although the housing shell blanks are identical prior to machining, the functional designations of the support locations are identified in FIGS. 4 and 5, such that offset support 32 of front housing shell 22 will overlie offset support 34 of rear housing shell 24 when housing shell is positioned thereon, with offset support 34 of front housing shell 22 overlying offset support 32 of rear housing shell 24.

Figure 6:
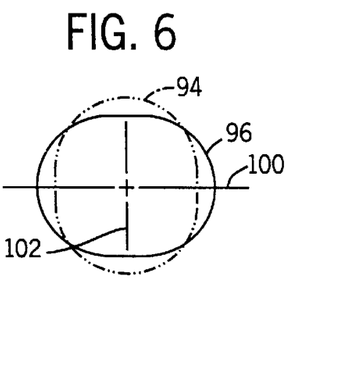
FIG. 6 is a detailed representation of a preferred technique for forming apertures for fasteners used to secure the housing shells to one another in a position-tolerant manner.

As noted above, the apertures formed in the peripheral flange of the gear reducer housing are preferably configured to permit tolerance in the alignment of the fastener apertures during assembly. In particular, where the apertures are cast in the blank for the gear reducer housing shells, such tolerance may be useful in permitting some degree of drift of the actual fastener position. FIG. 6 illustrates the general configuration of these apertures in the preferred embodiment. In particular, each generally horizontally disposed aperture 96 has a major axis 100 and a minor axis 102. The aperture is extended along axis 100 such that its dimension along this axis is greater than its dimension along axis 102. Conversely, generally vertically disposed apertures 94 have a dimension extended along axis 102 with respect to their dimensions along axis 100. Thus, when the housing shells are secured to one another for product assembly, some degree of tolerance or drift of the actual point of crossing of the apertures is permitted, while maintaining the desired fastener clearance as defined by the smaller of the axial dimensions of apertures 94 and 96 (the dimension of aperture 96 along axis 102 and the dimension of aperture 94 along axis 100). It should be noted that the apertures need not be oriented along axes which are aligned with or orthogonal to centerline 40 of the gear reducer housing as in the illustrated embodiment. Rather, in general, the axes may be rotated from the orientation illustrated and permit some degree of tolerance in the location of the fasteners as described. Moreover, major and minor axes for each aperture may be angularly oriented with one another by angles other than 90 degrees and still permit some degree of fastener location tolerance.

Figure 7:
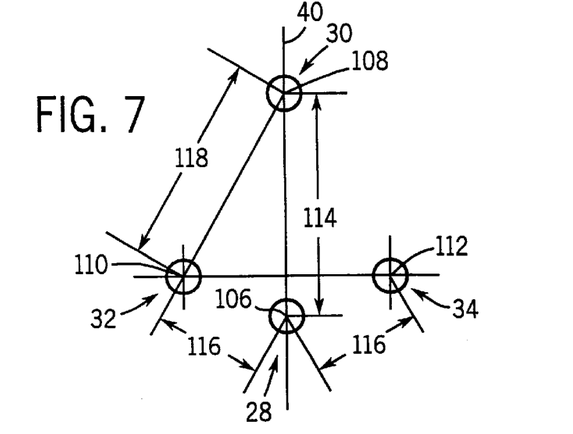
FIG. 7 is a diagrammatical representation of a preferred lay out for rotating assembly or shaft positions in the housing designed to permit additional flexibility in the use of the housing for different gear reduction ratios and different numbers of gear reduction stages.

As noted above, the preferred embodiment of the gear reducer and gear reducer housing described above includes supports for rotational assemblies positioned at mirror-image locations. FIG. 7 illustrates diagrammatically an exemplary and preferred lay out for the rotational axes in the embodiments described above. As shown in FIG. 7, first and second of the rotational assembly supports, designated by reference numerals 28 and 30, lie along a centerline 40 of the gear reducer and gear reducer housing. Additional third and fourth rotating assembly supports 32 and 34 are provided at mirror-image offset locations from the centerline 40. In the diagrammatical representation of FIG. 7, the supports for the rotating assemblies are provided at locations 106 and 108 along the centerline 40, and at the offset locations 110 and 112 on either side of the centerline. Moreover, locations 106 and 108 are spaced from one another by a distance DA, represented by reference numeral 114 in FIG. 7. Location 106 is also spaced from locations 110 and 112 by a distance DB, as denoted by reference numeral 116 in FIG. 7. Finally, location 110 is spaced from location 108 by a distance DC, as indicated by reference numeral 118 in FIG. 7 (location 112 being similarly spaced from location 108).

The symmetrical disposition of the axis locations for the rotating assemblies in the present technique permit considerable design flexibility and interchangeabilty of parts in the product and in families of products. In particular, in the foregoing arrangements, distance DA (114 in FIG. 7) is selected to accommodate the appropriate center distance for single-stage gear reducers such as gear reducer 11 described above. Distances DB and DC (116 and 118 in FIG. 7) are then selected to accommodate various configurations for first and second stages of two-stage gear reducers. The symmetrical disposition of locations 110 and 112 allow for the use of identical components on front and rear sections of the final product, and particularly of housing shell blanks which are machined at appropriate locations to receive rotating assembly support bearings.

It should be noted that the axis layout of FIG. 7 may be modified or utilized in various way to obtain similar advantages throughout various product configurations. For example, while in the presently preferred embodiment an input rotating assembly is positioned at location 106, with an output rotating assembly positioned at location 108, one or both of these locations could be used for input or output, or input and output rotating assemblies could be positioned at either of locations 110 or 112. Moreover, the particular spacing selected between the rotating assembly axis locations will vary depending upon the gearing selected, the torque and power ratings of the gear reducers, the number of different combinations of gearing within the gear reducers, and the need to utilize similar or identical components between single and multiple-stage gear reducers.

Figure 8:
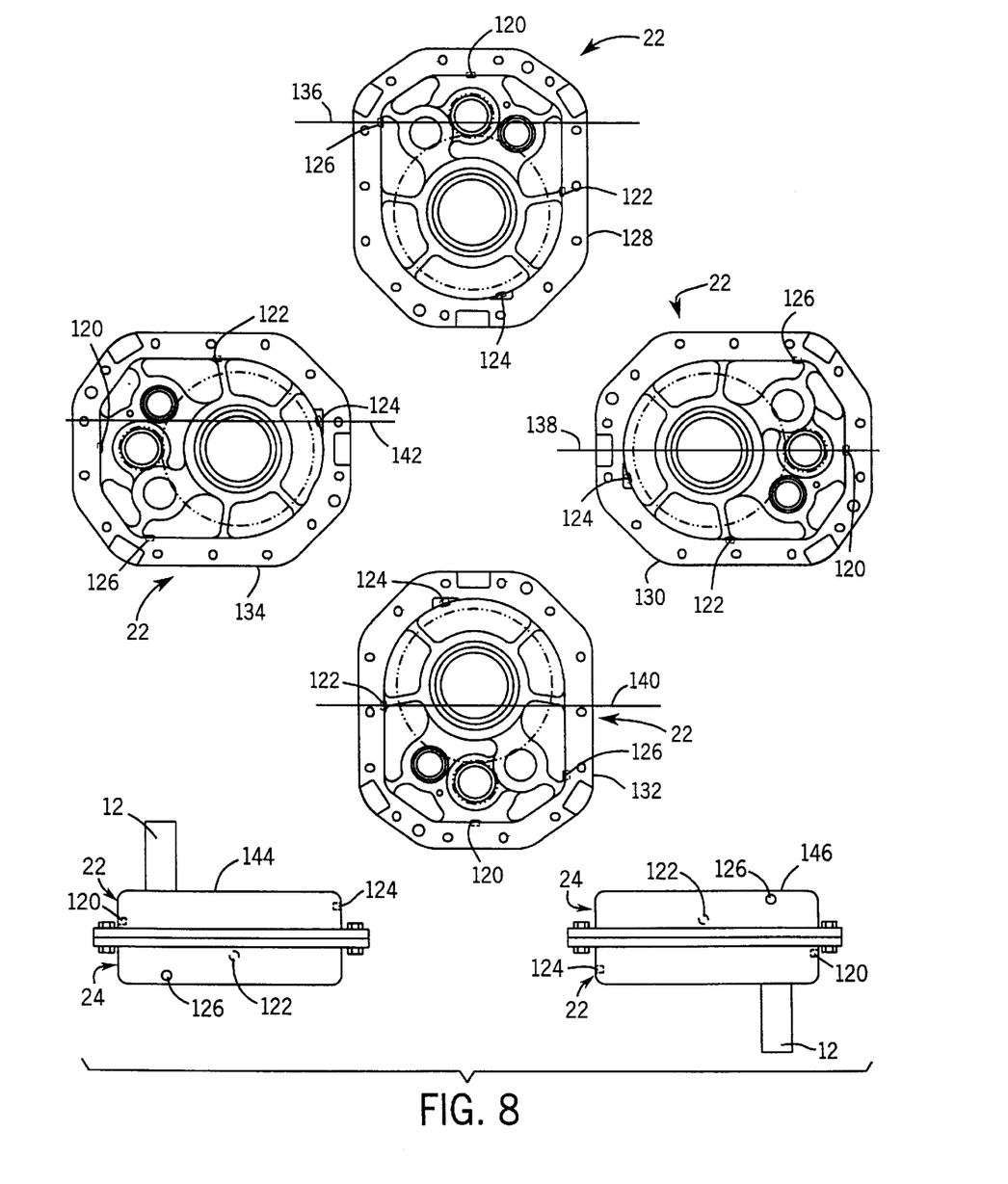
FIG. 8 is a series of elevational views of gear reducers including housings designed in accordance with the present technique, and showing various orientations permissible by virtue of the positioning of lubricant fill, drain, and level apertures in the housing.

The use of a modular housing and assembly approach to the gear reducers described above offers additional advantages as indicated in FIG. 8. In particular, the housings may be mounted in one of several different orientations based upon the particular application and the machine support provided in the application. In a presently preferred configuration, at least one of the housing shells is provided with a series of ports or threaded apertures for receiving lubricant, draining lubricant, and controlling lubricant level. As shown in FIG. 8, four such apertures are provided in the illustrated embodiment, including apertures 120, 122, 124 and 126. FIG. 8 illustrates a series of four different exemplary positions in which the gear reducer may be oriented, with the apertures serving different purposes in each position. The locations of the apertures are preferably selected to accommodate these different functions.

The positions illustrated in FIG. 8 include a first position 128, a second position 130, a third position 132, and a fourth position 134 (moving from the uppermost image in a clockwise direction in FIG. 8). In each position, one of the apertures serves as a fluid fill port in which a lubricating oil may be poured to provide lubrication of the rotating assemblies. An additional port serves as a fluid level control port. A third port serves in each position as a fluid drain port. In the embodiments illustrated in FIG. 8, each port is provided along a desired fluid level as defined by the particular locations of the rotating assembly supports. The function of the ports then depends upon the particular orientation of the gear reducer adopted in the application.

In the specific embodiment illustrated in FIG. 8, a first fluid level 136 is defined in orientation 128, with port 126 being located at that level. Port 120 then serves as a fluid fill port and port 124 serves as a drain port. In orientation 130, a desired lubricant level 138 is defined, and port 120 is positioned at that level. Port 122 then serves as a drain port, with port 126 serving as a fill port. In orientation 132, a desired lubricant level 140 is defined, with port 122 being located at that level, port 120 serving as a drain port, and port 124 serving as a fill port. Finally, in orientation 134, a desired lubricant level 142 is defined, with port 124 being provided at that level, port 122 serving as a fill port, and port 126 serving as a drain port. It should also be noted that ports 120, 122, 124 and 126 do not have to be on one housing shell 22 as shown. For example, ports 122 and 126 could be moved to shell 24 with the same function being provided. In this case, the ports could be moved axially along the gear case and serve as fill, drain and level holes when the reducer is mounted with the shaft axes vertical and the input shaft extending either up or down as in positions indicated by reference numerals 144 and 146 in FIG. 8, respectively. In this orientation with the input shaft extending up, port 124 is the fill port, port 126 is the drain port and port 120 is the level port. In orientation input shaft extending down, port 126 is the fill port, port 124 is the drain port and port 122 is the level port.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A housing for a gear reducer, the housing comprising: first and second identical housing halves, each housing half including an interior portion for receiving a plurality of bearing sets and rotating assemblies, the interior portion being surrounded by a rear wall portion and a peripheral wall, the rear wall of each housing half including a first and second bearing support structures disposed along a centerline of the housing half, and third and fourth bearing support structures disposed at mirror-image locations offset from the centerline, the first and second housing halves being configured to be secured to one another to enclose an interior volume, whereby when the housing halves are secured to one another the first support structures are coaxial, the second support structures are coaxial, the third bearing support structure of the first housing half is coaxial with the fourth bearing support structure of the second housing half, and the fourth bearing support structure of the first housing half is coaxial with the third bearing support structure of the second housing half.

2. The housing of claim 1, wherein locations of the first, second, third and fourth support structures of each housing half form vertices of a quadrilateral having internal angles less than 180 degrees.

3. The housing of claim 1, wherein locations of the first and second support structures are spaced from one another by a distance DA, a location of the first support structure is spaced from locations of the third and fourth support structures by a distance DB, and a location of the second support structure is spaced from the third and fourth support structures by a distance DC, the distance DB being smaller than the distances DA and DC.

4. The housing of claim 3, wherein the distance DA is selected based upon a desired center distance of a single stage gear reducer.

5. The housing of claim 3, wherein the distances DB and DC are selected based upon desired center distances for first and second stages of a two-stage gear reducer.

6. The housing of claim 1, wherein the peripheral wall of each housing half is at least partially surrounded by an integral peripheral flange having apertures for receiving fasteners for securing the first and second housing halves to one another.

7. The housing of claim 6, wherein the apertures are located at mirror image locations with respect to the centerline.

8. The housing of claim 6, wherein the apertures of the flange are non-circular.

9. The housing of claim 6, wherein each aperture of the flange includes a major axis and a minor axis transverse to the major axis, the aperture being elongated along the major axis, and wherein apertures on a left side of each housing half with respect to the centerline are paired with apertures on a right side of each housing half, whereby the major axis of each aperture on the left side is transverse to the major axis of each aperture on the right side.

10. The housing of claim 6, wherein peripheral flange has a nominal thickness and includes a plurality of fixture points of thickness less than the nominal thickness.

11. The housing of claim 1, wherein the peripheral wall of at least one of the housing halves includes at least four lubricant apertures, the lubricant apertures being disposed at locations in the side walls displaced from on another, whereby the apertures are alternatively positioned at a fill location, a drain location and a recommended level location in at least three mutually orthogonal mounting orientations of the housing.

12. A housing component for a gear reducer, the housing component comprising:
   a rear wall portion including a first and second bearing support structures disposed along a centerline of the housing component, and third and fourth bearing support structures disposed at mirror-image locations offset from the centerline each support structure being configured to support a bearing set;
   a peripheral wall portion integral with the rear wall portion and surrounding the rear wall portion to form an interior portion for receiving a plurality of bearing sets and intermeshing rotating assemblies.

13. The housing component of claim 12, wherein locations of the first, second, third and fourth support structures of each housing half form vertices of a quadrilateral having internal angles less than 180 degrees.

14. The housing component of claim 12, wherein locations of the first and second support structures are spaced from one another by a distance DA, a location of the first support structure is spaced from locations of the third and fourth support structures by a distance DB, and a location of the second support structure is spaced from the third and fourth support structures by a distance DC, the distance DB being smaller than the distances DA and DC.

15. The component housing of claim 12, wherein the peripheral wall portion is at least partially surrounded by an integral peripheral flange having apertures for receiving fasteners for securing the housing component to a similar housing component.

16. The housing component of claim 15, wherein the apertures are located at mirror image locations with respect to the centerline.

17. The housing component of claim 15, wherein the apertures of the flange are non-circular.

18. The housing component of claim 15, wherein each aperture of the flange includes a major axis and a minor axis transverse to the major axis, the aperture being elongated along the major axis, and wherein apertures on a left side of the component with respect to the centerline are paired with apertures on a right side of the component, whereby the major axis of each aperture on the left side is transverse to the major axis of each aperture on the right side.

19. The housing component of claim 15, wherein peripheral flange has a nominal thickness and includes a plurality of fixture points of thickness less than the nominal thickness.

20. The housing component of claim 15, wherein the peripheral wall includes at least four lubricant apertures, the lubricant apertures being disposed at locations in the side walls displaced from on another, whereby the apertures are alternatively positioned at a fill location, a drain location and a recommended level location in at least three mutually orthogonal mounting orientations of the housing.

21. A housing for a gear reducer comprising:
   a left housing portion; and
   a right housing portion configured for assembly with the left housing portion to define an inner cavity therebetween;
   the left and right housing portions each including a first shaft support along a central axis thereof, a second shaft support along the central axis spaced from the first shaft support by a distance DA, and third and fourth shaft supports disposed at mirror-image locations on either side of the central axis, the first shaft support being spaced from the third and fourth shaft supports by a distance DB, and the second shaft support being spaced from the third and fourth shaft supports by a distance DC, the distances DA and DC being greater than the distance DB.

22. The housing of claim 21, wherein locations of the first, second, third and fourth support of each housing portion form vertices of a quadrilateral having internal angles less than 180 degrees.

23. The housing of claim 21, wherein the distance DA is selected based upon a desired center distance of a single stage gear reducer.

24. The housing of claim 21, wherein the distances DB and DC are selected based upon desired center distances for first and second stages of a two-stage gear reducer.

25. The housing of claim 21, wherein each housing portion includes a peripheral wall at least partially surrounded by an integral peripheral flange having apertures for receiving fasteners for securing the first and second housing portions to one another.

26. The housing of claim 25, wherein the apertures are located at mirror image locations with respect to the centerline.

27. The housing of claim 25, wherein the apertures of the flange are non-circular.

28. The housing of claim 25, wherein the peripheral flange is substantially continuous.

29. A housing for a gear reducer, the housing comprising:
   first and second housing shells having longitudinal centerlines and configured to be secured to one another for supporting a plurality of intermeshing rotating assemblies;
   a peripheral flange at least partially surrounding each housing shell, each peripheral flange including a plurality of apertures for receiving fasteners for securing the housing shells to one another, the apertures are located at mirror image locations with respect to the centerline.

30. The housing of claim 29, comprising a plurality of supports for intermeshing rotating assemblies, two rotating assembly supports being provided on along the centerlines of the housing shells, and two rotating assembly supports being provided at mirror image locations with respect to the centerlines.

31. The housing of claim 30, wherein the apertures of the flange are non-circular.

32. The housing of claim 30, wherein each aperture of the flange includes a major axis and a minor axis transverse to the major axis, the aperture being elongated along the major axis, and wherein apertures of the first housing shell align with apertures of the second housing shell, whereby the major axis of each aperture on the first housing shell side is transverse to the major axis of each aperture on the second housing shell.

33. The housing of claim 30, wherein peripheral flange has a nominal thickness and includes a plurality of fixture points of thickness less than the nominal thickness.

* * * * *